US005705588A

United States Patent [19]

Kreis et al.

[11] Patent Number: 5,705,588

[45] Date of Patent: Jan. 6, 1998

[54] ORGANOPOLYSILOXANE COMPOSITIONS WHICH CAN BE CROSSLINKED TO GIVE ELASTOMERS

[75] Inventors: Gerhard Kreis; Michael Stepp; Johann Mueller, all of Burghausen, Germany

[73] Assignee: Wacker-Chemie GmbH, Munich, Germany

[21] Appl. No.: 446,741

[22] PCT Filed: Dec. 9, 1993

[86] PCT No.: PCT/EP93/03465

§ 371 Date: May 31, 1995

§ 102(e) Date: May 31, 1995

[87] PCT Pub. No.: WO94/13741

PCT Pub. Date: Jun. 23, 1994

[30] Foreign Application Priority Data

Dec. 10, 1992 [DE] Germany .......................... 42 41 713.9

[51] Int. Cl.$^6$ .......................... C08G 77/08

[52] U.S. Cl. .......................... 528/24; 524/588; 525/477

[58] Field of Search .......................... 528/24; 524/588; 525/477

[56] References Cited

U.S. PATENT DOCUMENTS

| | | | |
|---|---|---|---|
| 2,803,619 | 8/1957 | Dickmann | 260/42 |
| 3,652,475 | 3/1972 | Wada et al. | 260/29.1 B |
| 3,660,345 | 5/1972 | Bobear | 260/375 B |
| 4,008,198 | 2/1977 | Krohberger et al. | 260/375 B |
| 4,725,643 | 2/1988 | Burkhardt | 524/789 |
| 5,122,562 | 6/1992 | Jeram et al. | 524/403 |

FOREIGN PATENT DOCUMENTS

| | | |
|---|---|---|
| 0567253 | 10/1993 | European Pat. Off. . |
| WO93/19122 | 9/1993 | WIPO . |

*Primary Examiner*—Margaret W. Glass

[57] ABSTRACT

New organopolysiloxane masses cross-linkable into elastomers by radical formation containing (1) high-viscosity diorganopolysiloxanes with a value equal to at least 3000 Nm, (2) low-viscosity vinyl-containing organopolysiloxanes having 20 to $1.10^6$ mPa·s at 25° C. consisting of siloxane units (M units) having the formulae $R^1R_2SiO_{1/2}$ and/or $R_3SiO_{1/2}$, of siloxane units (D units) having the formulae $R^1RSiO$ and/or $R_2SiO$ and optionally HRSiO, and of siloxane units (T or Q units) having the formulas $RSiO_{3/2}$ and/or $R_1SiO_{3/2}$ and/or $SiO_2$, in which R stands for a monovalent, possibly substituted hydrocarbon residue with 1 to 18 hydrocarbon atoms and $R_1$ stands for a vinyl residue, provided that the organopolysiloxanes contain at least 1.0% by weight Si-bound vinyl groups; as well as (3) fillers.

18 Claims, No Drawings

ORGANOPOLYSILOXANE COMPOSITIONS WHICH CAN BE CROSSLINKED TO GIVE ELASTOMERS

The invention relates to organopolysiloxane compositions which can be crosslinked by means of free radical formation to give elastomers, and to a process for their preparation.

Compositions which can be crosslinked by means of free radical formation to give elastomers, are based on high-viscosity diorganopolysiloxanes and fillers and are crosslinked by addition of organic peroxides are known. To achieve favourable mechanical properties, such as good elongation at break and tear propagation resistance, mixtures of 2 to 3 different types of high-viscosity diorganopolysiloxanes having a different vinyl content and different siloxane units are employed. Reference may be made in this context to, for example, U.S. Pat. No. 3,652,475 and U.S. Pat. No. 3,660,345.

However, the use of different types of high-viscosity diorganopolysiloxanes has disadvantages in the logistics of the polymers and in the preparation of the compositions, in particular by continuous operation, since several metering pumps are required for the various polymers.

U.S. Pat. No. 2,803,619 describes compositions which can be crosslinked by means of free radical formation to form elastomers, comprise vinyl-free diorganopolysiloxanes and vinyl-containing, linear organopolysiloxanes having at least 12 silicon atoms and give elastomers having a low compression set.

There was the object of providing organopolysiloxane compositions which can be crosslinked by means of free radical formation to give elastomers and comprise a reduced number of high-viscosity diorganopolysiloxanes, with which the abovementioned disadvantages are avoided and with which elastomers having favorable mechanical properties, such as good elongation at break and tear propagation resistance, are obtained. The object is achieved by the invention.

The invention provides organopolysiloxane compositions which can be crosslinked by means of free radical formation to give elastomers and comprise (1) high-viscosity diorganopolysiloxanes having a value of at least 3000 Nm determined in a Brabender Plastograph at 23° C. and 60 revolutions per minute, (2) low-viscosity vinyl-containing organopolysiloxanes having an average viscosity of 20 to $1\times10^6$ mPa·s at 25° C., consisting of siloxane units (M units) of the formulae $R^1R_2SiO_{1/2}$ and/or $R_3SiO_{1/2}$, siloxane units (D units) of the formulae $R^1RSiO$ and/or $R_2SiO$ and if appropriate HRSiO and siloxane units (T and Q units) of the formulae $RSiO_{3/2}$ and/or $R^1SiO_{3/2}$ and/or $SiO_2$ in which R is a monovalent, unsubstituted or substituted hydrocarbon radical having 1 to 18 carbon atoms per radical and $R^1$ is a vinyl radical, with the proviso that the organopolysiloxanes contain at least 1.0% by weight of Si-bonded vinyl groups, and (3) fillers.

The invention further provides a process for the preparation of the organopolysiloxane compositions which can be crosslinked by means of free radical formation to give elastomers, by mixing (1) high-viscosity diorganopolysiloxanes with (2) low-viscosity vinyl-containing organopolysiloxanes and (3) fillers and if appropriate further substances.

The high-viscosity diorganopolysiloxanes used as (1) in the compositions according to the invention are those of the general formula $$R_z^1R_{3-z}SiO[R_2SiO]_x[R^1RSiO]_ySiR_{3-z}R_z^1 \quad (I)$$

in which

R is a monovalent, unsubstituted or substituted hydrocarbon radical having 1 to 18 carbon atoms per radical, $R^1$ is a vinyl radical, z is 0 or 1, x is an integer and y is 0 or an integer, and wherein the sum of x+y is an integer having a value such that the value determined in the Brabender Plastograph at 23° C. and 60 revolutions per minute is at least 3000 Nm.

Although not shown in formula (I), up to 1 mol % of the diorganopolysiloxane units can be replaced by other siloxane units, but usually only siloxane units which are present as impurities which are more or less difficult to avoid, such as $R_3SiO_{1/2}$, $RSiO_{3/2}$ and $SiO_{4/2}$ units, in which R has the meaning given above for this radical.

Examples of radicals R are alkyl radicals, such as the methyl, ethyl, n-propyl, iso-propyl, n-butyl, iso-butyl, tert-butyl, n-pentyl, iso-pentyl, neo-pentyl and tert-pentyl radical; hexyl radicals, such as the n-hexyl radical; heptyl radicals, such as the n-heptyl radical; octyl radicals, such as the n-octyl radical, and iso-octyl radicals, such as the 2,2,4-trimethylpentyl radical; nonyl radicals, such as the n-nonyl radical; decyl radicals, such as the n-decyl radical; dodecyl -radicals, such as the n-dodecyl radical; octadecyl radicals, such as the n-octadecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl and anthryl and phenanthryl radical; alkaryl radicals, such as o-, m- and p-tolyl radicals, xylyl radicals and ethylphenyl radicals; and aralkyl radicals, such as the benzyl radical and the α- and the β-phenylethyl radical.

Examples of substituted radicals R are cyanoalkyl radicals, such as the β-cyanoethyl radical, and halogenated hydrocarbon radicals, for example haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radical.

Because of easier availability at least, the methyl radical is the preferred radical R.

The high-viscosity diorganopolysiloxanes (1) employed in the compositions according to the invention preferably have a value of 3000 to 10000 Nm, preferably 4500 to 7500 Nm, determined in a Brabender Plastograph at 23° C. and 60 revolutions per minute.

The high-viscosity diorganopolysiloxanes (1) can be free of Si-bonded vinyl groups, i.e. in formula (I), z and y have the value 0. Examples of these are diorganopolysiloxanes consisting of dimethylsiloxane and trimethylsiloxane units.

The high-viscosity diorganopolysiloxanes (1) can contain Si-bonded vinyl groups. The vinyl groups here can be at the chain end and/or in the chain. Examples of such compounds are diorganopolysiloxanes containing dimethylsiloxane and vinyldimethylsiloxane units, diorganopolysiloxanes containing dimethylsiloxane, vinylmethylsiloxane and vinyldimethylsiloxane units and diorganopolysiloxanes containing dimethylsiloxane, vinylmethylsiloxane and trimethylsiloxane units.

The vinyl-containing diorganopolysiloxanes (1) preferably contain the vinyl groups in amounts such that one vinyl group is present per 500 to 2000 silicon atoms.

Preferably one type of high-viscosity diorganopolysiloxane (1) is employed in the compositions according to the invention, which has the advantage that the number of high-viscosity diorganopolysiloxanes (1) employed is reduced from three diorganopolysiloxanes to one diorganopolysiloxane. However, this does not exclude the high-viscosity diorganopolysiloxanes (1) being mixtures as a result of their preparation. For example, if hexamethyldisilazane and 1,3-divinyl-1,1,3,3-tetramethyldisilazane are employed for stopping the ends of the diorganopolysiloxanes during preparation of the high-viscosity diorganopolysiloxanes by the process according to U.S. Pat. No. 4,725,643, mixtures of diorganopolysiloxanes having trimethylsiloxy end groups and/or vinyldimethylsiloxy end groups are obtained.

Examples of low-viscosity, vinyl-containing organopolysiloxanes (2) which are employed in the compositions according to the invention are those of $R^1R_2SiO_{1/2}$, $R_2SiO$, $R^1RSiO$ and $RSiO_{3/2}$ units,
$R^1R_2SiO_{1/2}$, $R_2SiO$, $R^1RSiO$ and $SiO_2$ units,
$R^1R_2SiO_{1/2}$, $R_2SiO$ and $RSiO_{3/2}$ units,
$R^1R_2SiO_{1/2}$, $R_2SiO$ and $SiO_2$ units,
$R^3SiO_{1/2}$, $R_2SiO$, $R^1RSiO$ and $RSiO_{3/2}$ units,
$R^3SiO_{1/2}$, $R_2SiO$, $R^1RSiO$ and $SiO_2$ units,
$R^1R_2SiO_{1/2}$, $R_2SiO$, $R^1RSiO$, HRSiO and $RSiO_{3/2}$ units,
$R^1R_2SiO_{1/2}$, $R_2SiO$, $R^1RSiO$, HRSiO and $SiO_2$ units and
$R^1R_2SiO_{1/2}$, $R_2SiO$, $R^1RSiO$ and $R_1SiO_{3/2}$ units, in which R and $R^1$ have the meaning given above for these radicals.

Low-viscosity vinyl-containing organopolysiloxanes (2) which are preferably employed in the compositions according to the invention are those of $R^1R_2SiO_{1/2}$, $R_2SiO$, $R^1RSiO$ and $RSiO_{3/2}$ units,
$R^1R_2SiO_{1/2}$, $R_2SiO$, $R^1RSiO$ and $SiO_2$ units,
$R^1R_2SiO_{1/2}$, $R_2SiO$, and $RSiO_{3/2}$ units or
$R^1R_2SiO_{1/2}$, $R_2SiO$, and $SiO_2$ units, particularly preferably of $R^1R_2SiO_{1/2}$, $R_2SiO$, $R^1RSiO$ and $RSiO_{3/2}$ units or
$R^1R_2SiO_{1/2}$, $R_2SiO$, $R^1RSiO$ and $SiO_2$ units, in which R and $R^1$ have the meaning given above for these radicals.

Siloxane units of the formula $R^1R_2SiO_{1/2}$ or $RSiO_{1/2}$ are called M units, siloxane units of the formula $R_2SiO$, $R^1RSiO$ or HRSiO are called D units, siloxane units of the formula $RSiO_{3/2}$ or $R^1SiO_{3/2}$ are called T units and siloxane units of the formula $SiO_2$ are called Q units, as is also customary in the technical literature.

Preferably in the low-viscosity vinyl-containing organopolysiloxanes (2) according to the invention which consist of M, D and T units, preferably of $R^1R_2SiO_{1/2}$, $R_2SiO$, $R^1RSiO$ and $RSiO_{3/2}$, the ratio of T units to M units is 1:5 to 1:100, preferably 1:6 to 1:24, and the ratio of T units to D units is 1:100 to 1:300, preferably 1:200 to 1:250. If the D units consist of $R_2SiO$ and $R^1RSiO$ units, the ratio of $R_2SiO$ units to $R^1RSiO$ units is 1:0.025 to 1:0.1.

Preferably, in the low-viscosity vinyl-containing organopolysiloxanes (2) according to the invention which consist of M, D and Q units, preferably of $R^1R_2SiO_{1/2}$, $R_2SiO$, $R^1RSiO$ and $SiO_2$, the ratio of Q units to M units is 1:5 to 1:100, preferably 1:6 to 1:24, and the ratio of Q units to D units is 1:100 to 1:300, preferably 1:200 to 1:250. If the D units consist of $R_2SiO$ and $R^1RSiO$ units, the ratio of $R_2SiO$ units to $R^1RSiO$ units is 1:0.025 to 1:0.1.

The low-viscosity vinyl-containing organopolysiloxanes (2) according to the invention preferably contain 1.0 to 10.3% by weight, preferably 1.0 to 8.5% by weight, of Si-bonded vinyl groups.

The low-viscosity vinyl-containing organopolysiloxanes (2) according to the invention preferably have an average viscosity of 30 to 1000 mPa·s at 25° C.

Low-viscosity vinyl-containing organopolysiloxanes (2) are preferably employed in the compositions according to the invention in amounts of 0.3 to 12% by weight, preferably 0.3 to 5.0% by weight, based on the total weight of the high-viscosity diorganopolysiloxanes (1).

One type of organopolysiloxane (2) can be employed, but a mixture of at least two different types of organopolysiloxanes (2) can also be employed.

The low-viscosity, vinyl-containing organopolysiloxanes (2) are prepared by known processes of silicone chemistry, for example by equilibration of vinyl-containing organo (poly)siloxanes with vinyl-free organo(poly)siloxanes, it being possible for T and/or Q units to be present both in the vinyl-containing and in the vinyl-free organo(poly) siloxanes, in the presence of acid or basic catalysts, such as benzyltrimethylammonium hydroxide, potassiumhydroxide, sulfuric acid, trifluoromethanesulfonic acid, phosphonitrilic chlorides or acid clays, such as the commercially obtainable "Tonsil", or by cohydrolysis or cocondensation of organo (poly)siloxanes and/or silanes containing hydrolyzable radicals or hydroxyl groups (if appropriate in the presence of auxiliary bases), it being possible for both the silanes employed and the organopolysiloxanes to be the basis for the T or Q units present in the end products.

Low-viscosity, vinyl-containing organopolysiloxanes (2) which can be employed in the compositions according to the invention are those which contain, in addition to siloxane units having Si-bonded vinyl groups, also siloxane units having Si-bonded hydrogen atoms, advantages resulting in respect of improved heat stability of the vulcanisates or improved adhesion of the vulcanisates to other substrates.

Since the organopolysiloxanes (2) are low-viscosity liquids and are employed in small amounts, they are easy to meter and to mix in, which is of advantage in particular for continuous operation.

Examples of fillers (3) are non-reinforcing fillers, that is to say fillers having a BET surface area of up to 50 $m^2/g$, such as quartz, diatomaceous earth, calcium silicate, zirconium silicate, zeolites, montmorrillonites, such as bentonites, metal oxide powders, such as the oxides of aluminum, titanium, iron or zinc and mixed oxides thereof, barium sulfate, calciumcarbonate, gypsum, nitrides, such as silicon nitride and boron nitride, carbides, such as silicon carbide, mixed oxides with nitrides and/or carbides, such as silicon oxynitride, glass powder and powders of plastic; reinforcing fillers, that is to say fillers having a BET surface area of more than 50 $m^2/g$, such as silicon dioxide having a BET surface area of at least 50 $m^2/g$, such as pyrogenic silica, precipitated silica, carbon black, such as furnace black and acetylene black, and silicon/aluminum mixed oxides of high BET surface area; and fibrous fillers, such as asbestos and fibers of plastic. The fillers mentioned can be hydrophobicized, for example by treatment with organosilicon compounds, such as hexamethyldisilazane, organosilanes or organosiloxanes, or by etherification of hydroxyl groups to give alkoxy groups. One type of filler can be employed, but a mixture of at least two fillers can also be employed.

Pyrogenic silicas and precipitated silicas having a BET surface area of at least 50 $m^2/g$ are preferably used as the fillers (3). These fillers are preferably hydrophobicized, it being possible for the hydrophobicizing of the fillers to be carried out before constituents (1) to (3) are mixed together or in the presence of the diorganopolysiloxanes (1), for example by treatment of silicon dioxides having a BET surface area of at least 50 $m^2/g$ with hexamethyldisilazane in the presence of the high-viscosity diorganopolysiloxanes, as described in U.S. Pat. No. 4,008,198.

Fillers (3) are employed in the compositions according to the invention in amounts of 40 to 60% by weight, based on the total weight of diorganopolysiloxanes (1).

In addition to constituents (1) to (3), the compositions according to the invention can comprise substances which are conventionally co-used for the preparation of compositions which can be crosslinked by means of free radical formation to give elastomers. Examples of such substances are agents for preventing stiffening of the compositions during storage, such as low molecular weight siloxanes having Si-bonded hydroxyl or alkoxy groups or alkoxysilanes, pigments, antioxidants, heat stabilizers, agents which render the compositions flame-resistant and light stabilizers.

The process according to the invention for the preparation of the compositions which can be crosslinked by means of free radical formation to give elastomers can be carried out batchwise, semi-continuously or completely continuously.

The compositions according to the invention are crosslinked by means of free radicals. Peroxides, in particular organic peroxides (4), are preferred as the source of free radicals. Examples of such organic peroxides are acyl peroxides, such as dibenzoyl peroxide, bis-(4-chlorobenzoyl) peroxide, bis(2,4-dichlorobenzoyl) peroxide and bis(4-methylbenzoyl) peroxide; alkyl peroxides and aryl peroxides, such as di-tert-butyl peroxide, 2,5-bis(tert-butylperoxy)-2,5-dimethylhexane, dicumyl peroxide and 1,3-bis(tert-butylperoxy-isopropyl)benzene; perketals, such as 1,1-bis-(tert-butylperoxy)-3,3,5-trimethylcyclohexane; peresters, such as diacetyl peroxydicarbonate, tert-butyl perbenzoate, tert-butylperoxy-isopropyl carbonate, tert-butylperoxy isononanoate, dicyclohexyl peroxydicarbonate and 2,5-dimethylhexane 2,5-diperbenzoate.

One type of organic peroxide (4) can be employed, but a mixture of at least two different types of organic peroxides (4) can also be employed.

The organic peroxides (4) are preferably employed in the compositions according to the invention in amounts of 0.35 to 2.0% by weight, preferably 0.35 to 1.5% by weight, in each case based on the total weight of the diorganopolysiloxanes (1).

If the compositions according to the invention comprise diorganopolysiloxanes which are free of vinyl groups, elastomers having good elongation at break and good tear propagation resistance are obtained. If the compositions according to the invention comprise diorganopolysiloxanes having vinyl groups on the chain end and/or in the chain, elastomers which additionally have an improved rebound and/or a low compression set are obtained.

The compositions according to the invention are preferably crosslinked at temperatures of 120° to 150° C.

The final shaping of the compositions according to the invention before crosslinking to give elastomers can be carried out in any desired manner which is suitable and in many cases known for shaping compositions which can be crosslinked to give elastomers and are based on high-viscosity diorganopolysiloxanes, for example by extrusion or compression molding.

The compositions according to the invention can be used for the production of silicone rubber sheets, films and hoses and compression molded articles of all types, for example O rings or seals.

Preparation of the Low-viscosity Vinyl-containing Organopolysiloxanes A to F

Organopolysiloxane A

A mixture of 1500 g of a dimethylpolysiloxane which is terminally blocked by vinyldimethylsiloxy groups and has a viscosity of 1000 mPa·s at 25° C., 85 g of 1,3-divinyl-1,1,3,3-tetramethyldisiloxane, 313 g of methylvinyldichlorosilane, 47 g of silicon tetrachloride and 3 ml of a 40% strength solution of phosphonitrilic chlorides in ethyl acetate was stirred at 100° C. for one hour, and 500 g of water were then added. After the mixture had been concentrated on a rotary evaporator at 100° C. under 8 mbar and filtered through 50 g of bentonite/15 g of magnesium oxide, 1594 g of a clear colorless oil having a viscosity of 80 $mm^2 \cdot s^{-1}$ at 25° C., which has the following composition, according to its $^{29}Si$- and $^1H$-NMR spectra, were obtained:

$[ViMe_2SiO_{1/2}]_4[ViMeSiO]_9[Me_2SiO]_{86}[SiO_2]$ (Me=methyl radical, Vi=vinyl radical)

Organopolysiloxane A contains 4.4% by weight of Si-bonded vinyl groups.

Organopolysiloxane B

A mixture of 4.32 g of tetrakis(dimethylvinylsiloxy) silane, 30.6 g of a diorganopolysiloxane of dimethylsiloxane and methylvinylsiloxane units, the ratio of dimethylsiloxane to methylvinylsiloxane units being 4 to 1, having terminal hydroxyl groups and a viscosity of 150 $mm^2 \cdot s^{-1}$ at 25° C., 30 g of a dimethylpolysiloxane having terminal hydroxyl groups and a viscosity of 50 $mm^2 \cdot s^{-1}$ and 0.15 ml of a 40% strength solution of phosphonitrilic chlorides in ethyl acetate was heated at 120° C. for two hours, while stirring. 1 ml of a concentrated aqueous ammonia solution was then added and the mixture was heated thoroughly up to 100° C. under 4 mbar in vacuo. After filtration through 2 g of bentonite, 51.5 g of a clear colorless oil having a viscosity of 80 $mm^2 \cdot s^{-1}$ at 25° C., which has the following composition, according to its $^{29}Si$- and $^1H$-NMR spectra, were obtained:

$[ViMe_2SiO_{1/2}]_4[ViMeSiO]_9[Me_2SiO]_{69}[SiO_2]$ (Me=methyl radical, Vi=vinyl radical )

Organopolysiloxane C

A mixture of 1500 g of a dimethylpolysiloxane terminally blocked by vinyldimethylsiloxy groups and having a viscosity of 1000 mPa·s at 25° C., 74.4 g of 1,3-divinyl-1,1,3,3-tetramethyldisiloxane, 282 g of methylvinyldichlorosilane, 12.5 g of methyltrichlorosilane and 3 ml of a 40% strength solution of phosphonitrilic chlorides in ethyl acetate was stirred at 100° C. for one hour, and 81 g of water were then added. After concentration on a rotary evaporator at 100° C. under 8 mbar and filtration through 40 g of bentonite/10 g of magnesium oxide, 1527 g of a clear colorless oil having a viscosity of 68 $mm^2 \cdot s^{-1}$ at 25° C., which has the following composition, according to its $^{29}Si$- and $^1H$-NMR spectra, were obtained:

$[ViMe_2SiO_{1/2}]_{9.4}[ViMeSiO]_{24}[Me_2SiO]_{226}[MeSiO_{3/2}]$ (Me=methyl radical, Vi=vinyl radical)

Organopolysiloxane D

A mixture of 444 g of a dimethylpolysiloxane having terminal hydroxyl groups and a viscosity of 20000 mPa·s at 25° C., 35.5 g of 1,3-divinyl-1,1,3,3-tetramethyldisiloxane, 211 g of methylvinyldichlorosilane, 15.3 g of silicon tetrachloride and 1.2 ml of a 40% strength solution of phosphonitrilic chlorides in ethyl acetate was stirred at 100° C. for two hours, and 121 g of water were then added. After concentration on a rotary evaporator at 100° C. under 5 mbar and filtration through 10 g of silica gel 60 (commercially obtainable from Merck), 320 g of a clear colorless oil having a viscosity of 97 $mm^2 \cdot s^{-1}$ at 25° C., which has the following composition, according to its $^{29}$Si- and $^{1}$H-NMR spectra, were obtained:

$[ViMe_2SiO_{1/2}]_3[ViMeSiO]_{16}[Me_2SiO]_{26}[SiO_2]$ (Me=methyl radical, Vi=vinyl radical)

Organopolysiloxane D contains 8.1% by weight of Si-bonded vinyl groups.

Organopolysiloxane E

A mixture of 1355 g of a dimethylpolysiloxane having terminal hydroxyl groups and a viscosity of 20000 mPa·s at 25° C. 28 3 g of dimethylvinylchlorosilane, 66 g of methylvinyldichlorosilane, 11.7 g of methyltrichlorosilane and 1.2 ml of a 40% strength solution of phosphonitrilic chlorides in ethyl acetate was stirred at 100° C. for two hours, and 54 g of water were then added. After concentration on a rotary evaporator at 100° C. under 2 mbar and filtration through 10 g of silica gel 60 (commercially obtainable from Merck), 1233 g of a clear colorless oil having a viscosity of 621 $mm^2 \cdot s^{-1}$ at 25° C., which has the following composition, according to its $^{29}$Si- and $^{1}$H-NMR spectra, were obtained:

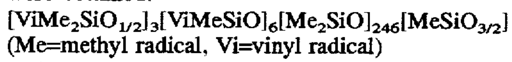

$[ViMe_2SiO_{1/2}]_3[ViMeSiO]_6[Me_2SiO]_{246}[MeSiO_{3/2}]$ (Me=methyl radical, Vi=vinyl radical)

Organopolysiloxane E contains 1.3% by weight of Si-bonded vinyl groups.

Organopolysiloxane F

A mixture of 1420 g of a dimethylpolysiloxane terminally blocked by vinyldimethylsiloxy groups and having a viscosity of 1000 mPa·s at 25° C., 60 g of a dimethylpolysiloxane terminally blocked by vinyldimethylsiloxy groups and having a viscosity of 12 $mm^2 \cdot s^{-1}$ at 25° C., 230 g of a diorganopolysiloxane of dimethylsiloxane and methylvinylsiloxane units, the ratio of dimethylsiloxane to methylvinylsiloxane units being 4 to 1, having terminal hydroxyl groups and a viscosity of 150 $mm^2 \cdot s^{-1}$ at 25° C., 22 g of methyltriacetoxysilane and 2 ml of a 40% strength solution of phosphonitrilic chlorides in ethyl acetate was stirred at 100° C. for one hour. 20 ml of a 5% strength aqueous potassium formate solution were then added and all the volatile constituents were distilled off in vacuo. After filtration through a pressure filter, 1670 g of a clear colorless oil having a viscosity of 591 $mm^2 \cdot s^{-1}$ at 25° C., which has the following composition, according to its $^{29}$Si- and $^{1}$H-NMR spectra, were obtained:

$[ViMe_2SiO_{1/2}]_3[ViMeSiO]_6[Me_2SiO]_{226}[MeSiO_{3/2}]$ (Me=methyl radical, Vi=vinyl radical)

EXAMPLES 1 TO 16

271 g of the particular diorganopolysiloxane mentioned in Tables 1 and 2 were mixed in a kneader first with the particular amounts of 1,3-divinyl-1,1,3,3-tetramethyldisilazane (disilazane) stated in Tables 1 and 2 and water, then with the particular organopolysiloxane mentioned in Tables 1 and 2 in the particular amounts, and finally with the particular amounts of hydrophobic pyrogenic silicon dioxide (HDK) having a BET surface area of 300 $m^2/g$ stated in Tables 1 and 2, the hydrophobicizing being carried out using hexamethyldisiloxane in the liquid phase before the constituents were mixed together. The mixture was mixed and heated thoroughly in the kneader at 150° C. for in each case three hours.

One portion of the mixture was mixed with in each case a paste of equal parts of bis(2,4-dichlorobenzoyl) peroxide (=peroxide 1) and a dimethylpolysiloxane terminally blocked by trimethylsiloxy groups and having a viscosity of 250 mPa·s at 25° C. in an amount of 1.5% by weight. Sheets having a thickness of 2 mm were in each case produced from this mixture by vulcanization at 135° C. in the course of 10 minutes. The sheets were then in each case heat-treated at 200° C. for four hours.

The other portion of the mixture was in each case mixed with dicumyl peroxide (=peroxide 2) in an amount of 0.7% by weight. Sheets having a thickness of 2 mm were in each case produced from this mixture by vulcanization at 165° C. in the course of 10 minutes. The sheets were then in each case heat-treated at 200° C. for four hours.

The mechanical values of the elastomers were determined and the results are summarized in Tables 3 to 6. The Shore A hardness was determined in accordance with DIN 53 505, the tear strength, elongation at break and tensile stress (modulus) at 100% and 300% elongation were determined in accordance with DIN 53 504 using standard bar S 3A, the tear propagation value was determined in accordance with ASTM D 624 B, the rebound was determined in accordance with DIN 53 512, the compression set was determined in accordance with DIN 53 517 and the Mooney viscosity was determined in accordance with DIN 53 523 at 23° C.

COMPARISON EXPERIMENT 1

A mixture of 751 g of a diorganopolysiloxane terminally blocked by vinyldimethylsiloxy groups and consisting of dimethylsiloxane and vinylmethylsiloxane units, one vinyl group being bonded to every 1200th silicon atom, and having a value of 5800 Nm determined in a Brabender Plastograph at 23° C. and 60 revolutions per minute, 268 g of a dimethylpolysiloxane terminally blocked by trimethylsiloxy groups and having a value of 6000 Nm determined in a Brabender Plastograph at 23° C. and 60 revolutions per minute, and 53.5 g of a diorganopolysiloxane terminally blocked by trimethylsiloxy groups and consisting of dimethylsiloxane and vinylmethylsiloxane units, one vinyl group being bonded to every 5th silicon atom, and having a value of 4000 Nm determined in a Brabender Plastograph at 23° C. and 60 revolutions per minute, was mixed in a kneader with 450.5 g of hydrophobic pyrogenic silicon dioxide having a BET surface area of 300 $m^2/g$, the hydrophobicizing being carried out using hexamethyldisilazane in the gas phase before the constituents were mixed together.

The mixture thus obtained was mixed with the organic peroxides and vulcanized, as described in Example 1, and the vulcanisates thus obtained were then heat-treated. The mechanical values were determined as described in Example 1. The results are summarized in Table 3.

COMPARISON EXPERIMENT 2

(U.S. Pat. No. 2,803,619)

The procedure of Example 16 was repeated, with the modification that 7.65 g of a linear vinyl-containing dimethylpolysiloxane of the formula $H_2C{=}CH(CH_3)_2SiO[Si(CH_3)_2O]_{10}Si(CH_3)_2CH{=}CH_2$ were employed instead of the 8.7 g of organopolysiloxane A.

The mixture thus obtained was mixed with the organic peroxides and vulcanized, as described in Example 16, and the vulcanisates thus obtained were then heat-treated. The mechanical values were determined as described in Example 16. The results are summarized in Table 7.

TABLE 1

| Example | 1 | 2 | 3 | 4 | 5 | 6 | 7 | 8 |
|---|---|---|---|---|---|---|---|---|
| Type of diorgano-poly-siloxane | I | II | III | I | II | III | I | I |
| Type of organo-poly-siloxane | A | A | A | C | C | C | A | C |
| Amount of organo-poly-siloxane [g] | 8.7 | 8.7 | 8.7 | 8.68 | 8.86 | 8.68 | 13.05 | 13.00 |
| Disila-zane [g] | 2.5 | 2.5 | 2.5 | 2.5 | 2.68 | 2.68 | 2.5 | 2.5 |
| Water [g] | 0.55 | 0.55 | 0.55 | 0.55 | 0.55 | 0.55 | 0.55 | 0.55 |
| HDK [g] | 150 | 150 | 150 | 150 | 150 | 150 | 150 | 150 |

TABLE 2

| Example | 9 | 10 | 11 | 12 | 13 | 14 | 15 | 16 |
|---|---|---|---|---|---|---|---|---|
| Type of diorgano-poly-siloxane | IV | IV | IV | IV | V | VI | VII | I |
| Type of organo-poly-siloxane | A | C | D | E | C | C | C | A |
| Amount of organo-poly-siloxane [g] | 2.0 | 1.53 | 1.2 | 7.0 | 8.7 | 8.7 | 8.7 | 8.7 |
| Disila-zane [g] | 2.71 | 2.71 | 2.71 | 2.71 | 2.71 | 2.71 | 2.71 | 2.5 |
| Water [g] | 0.6 | 0.6 | 0.6 | 0.6 | 0.6 | 0.6 | 0.6 | 0.55 |
| HDK [g] | 150 | 150 | 130 | 130 | 150 | 150 | 150 | 150 |

Diorganopolysiloxane I

Dimethylpolysiloxane terminally blocked by trimethylsiloxy groups and having a value of 6000 Nm determined in a Brabender Plastograph at 23° C. and 60 revolutions per minute. The Brabender value is a measure of the viscosity of the diorganopolysiloxanes.

Diorganopolysiloxane II

Dimethylpolysiloxane terminally blocked by vinyldimethylsiloxy groups and having a value of 6500 Nm determined in a Brabender Plastograph at 23° C. and 60 revolutions per minute.

Diorganopolysiloxane III

Diorganopolysiloxane terminally blocked by vinyldimethylsiloxy groups and consisting of dimethylsiloxane and vinylmethylsiloxane units, one vinyl group being bonded to each 1200th silicon atom, and having a value of 5800 Nm determined in a Brabender Plastograph at 23° C. and 60 revolutions per minute.

Diorganopolysiloxane IV

Diorganopolysiloxane terminally blocked by vinyldimethylsiloxy groups and consisting of dimethylsiloxane and vinylmethylsiloxane units, one vinyl group being bonded to every 500th silicon atom, and having a value of 5500 Nm determined in a Brabender Plastograph at 23° C. and 60 revolutions per minute.

Diorganopolysiloxane V

Diorganopolysiloxane terminally blocked by trimethylsiloxy groups and consisting of dimethylsiloxane and vinylmethylsiloxane units, one vinyl group being bonded to every 2000th silicon atom, and having a value of 6300 Nm determined in a Brabender Plastograph at 23° C. and 60 revolutions per minute.

Diorganopolysiloxane VI

Diorganopolysiloxane terminally blocked by trimethylsiloxy groups and consisting of dimethylsiloxane and vinylmethylsiloxane units, one vinyl group being bonded to every 1000th silicon atom, and having a value of 6500 Nm determined in a Brabender Plastograph at 23° C. and 60 revolutions per minute.

Diorganopolysiloxane VII

Mixture of diorganopolysiloxanes terminally blocked by trimethylsiloxy groups and/or vinyldimethylsiloxy groups and consisting of dimethylsiloxane and vinylmethylsiloxane units, one vinyl group being bonded to every 1400th silicon atom, and having a value of 6000 Nm determined in a Brabender Plastograph at 23° C. and 60 revolutions per minute obtained, as a result of preparation, by stopping the ends of the diorganopolysiloxanes with a mixture of hexamethyldisilazane and 1,3-divinyl-1,1,3,3-tetramethyldisilazane in accordance with U.S. Pat. No. 4,725,643.

TABLE 3

| Example | Comparison Experiment | | 1 | | 2 | | 3 | |
|---|---|---|---|---|---|---|---|---|
| Peroxide | 1 | 2 | 1 | 2 | 1 | 2 | 1 | 2 |
| Shore A hardness | 45 | 46 | 49 | 50 | 52 | 55 | 52 | 55 |
| Tear strength N/mm² | 8.9 | 9.8 | 9.9 | 9.8 | 10.5 | 9.6 | 10.3 | 10.7 |
| Modulus 100% | 1.3 | 1.0 | 1.5 | 1.2 | 1.5 | 1.3 | 1.6 | 1.4 |
| Modulus 300% | 3.7 | 2.4 | 4.4 | 3.2 | 4.8 | 4.0 | 5.0 | 4.2 |
| Elongation at break % | 620 | 790 | 610 | 740 | 560 | 550 | 530 | 580 |
| Tear propagation value N/mm | 33.3 | 34.6 | 42.7 | 49.1 | 33.1 | 38.0 | 31.9 | 34.8 |
| Rebound % | 49 | 48 | 42 | 39 | 49 | 48 | 48 | 49 |
| Compression set % | 30/31 | 22/23 | 16/17 | 31/31 | 25/25 | 16/17 | 22/22 | 25/26 |
| Mooney viscosity | 36/34 | | 46/44 | | 53/46 | | 45/41 | |

TABLE 4

| Example | 4 | | 5 | | 6 | | 7 | |
|---|---|---|---|---|---|---|---|---|
| Peroxide | 1 | 2 | 1 | 2 | 1 | 2 | 1 | 2 |
| Shore A hardness | 48 | 46 | 54 | 57 | 54 | 59 | 50 | 54 |
| Tear strength N/mm² | 10.3 | 10.0 | 10.2 | 11.7 | 11.0 | 10.4 | 9.9 | 9.8 |
| Modulus | 1.3 | 1.0 | 1.7 | 1.6 | 1.7 | 1.8 | 1.4 | 1.5 |

TABLE 4-continued

| Example | 4 | | 5 | | 6 | | 7 | |
|---|---|---|---|---|---|---|---|---|
| Peroxide | 1 | 2 | 1 | 2 | 1 | 2 | 1 | 2 |
| 100% Modulus 300% | 4.2 | 2.7 | 5.6 | 4.8 | 5.7 | 5.5 | 4.2 | 3.8 |
| Elongation at break % | 640 | 810 | 480 | 570 | 510 | 490 | 660 | 700 |
| Tear propagation value N/mm | 42.3 | 51.0 | 32.7 | 35.0 | 33.2 | 37.7 | 42.8 | 48.7 |
| Rebound % | 41 | 36 | 50 | 51 | 50 | 53 | 40 | 40 |
| Compression set % | 32/ 32 | 20/ 20 | 24/ 25 | 12/ 12 | 23/ 24 | 10/ 12 | 34/ 33 | 22/ 21 |
| Mooney viscosity | 45/43 | | 52/50 | | 41/39 | | 48/46 | |

TABLE 5

| Example | 8 | | 9 | | 10 | | 11 | |
|---|---|---|---|---|---|---|---|---|
| Peroxide | 1 | 2 | 1 | 2 | 1 | 2 | 1 | 2 |
| Shore A hardness | 48 | 51 | 51 | 55 | 51 | 55 | 48 | 50 |
| Tear strength N/mm² | 9.1 | 9.4 | 10.0 | 10.5 | 9.8 | 9.6 | 9.3 | 8.9 |
| Modulus 100% | 1.4 | 1.3 | 1.5 | 1.6 | 1.5 | 1.7 | 1.3 | 1.3 |
| Modulus 300% | 4.1 | 3.5 | 6.1 | 6.6 | 6.3 | 6.9 | 5.1 | 5.3 |
| Elongation at break % | 610 | 690 | 440 | 420 | 420 | 380 | 470 | 440 |
| Tear propagation value N/mm | 44.0 | 51.2 | 20.4 | 21.8 | 20.3 | 21.2 | 21.2 | 22.4 |
| Rebound % | 40 | 39 | 53 | 55 | 54 | 54 | 53 | 52 |
| Compression set % | 31/ 32 | 23/ 23 | 18/ 18 | 6/ 4 | 20/ 19 | 11/ 9 | 16/ 17 | 8/ 9 |
| Mooney viscosity | 47/43 | | 41/39 | | 39/37 | | 40/37 | |

TABLE 6

| Example | 12 | | 13 | | 14 | | 15 | |
|---|---|---|---|---|---|---|---|---|
| Peroxide | 1 | 2 | 1 | 2 | 1 | 2 | 1 | 2 |
| Shore A hardness | 49 | 54 | 51 | 51 | 51 | 51 | 52 | 54 |
| Tear strength N/mm² | 9.4 | 8.0 | 10.0 | 10.2 | 9.9 | 9.7 | 10.6 | 11.6 |
| Modulus 100% | 1.5 | 1.8 | 1.6 | 1.3 | 1.6 | 1.3 | 1.6 | 1.5 |
| Modulus 300% | 5.7 | 6.8 | 5.1 | 3.8 | 5.0 | 4.1 | 5.1 | 5.4 |
| Elongation at break % | 430 | 350 | 540 | 650 | 540 | 600 | 550 | 620 |
| Tear propagation value N/mm | 21.3 | 21.9 | 36.8 | 44.7 | 35.3 | 42.0 | 36.2 | 37.4 |

TABLE 6-continued

| Example | 12 | | 13 | | 14 | | 15 | |
|---|---|---|---|---|---|---|---|---|
| Peroxide | 1 | 2 | 1 | 2 | 1 | 2 | 1 | 2 |
| Rebound % | 53 | 57 | 44 | 40 | 45 | 45 | 47 | 47 |
| Compression set % | 12/ 14 | 5/ 6 | 31/ 31 | 20/ 22 | 28/ 28 | 19/ 19 | 26/ 26 | 15/ 15 |
| Mooney viscosity | 39/37 | | 61/54 | | 66/59 | | 54/50 | |

TABLE 7

| Example | 16 | | Comparison Experiment 2 | |
|---|---|---|---|---|
| Peroxide | 1 | 2 | 1 | 2 |
| Shore A hardness | 56 | 55 | 49 | 49 |
| Tear strength N/mm² | 10.8 | 9.5 | 10.8 | 10.6 |
| Modulus 100% | 1.8 | 1.6 | 1.4 | 1.2 |
| Modulus 300% | 5.1 | 3.8 | 4.6 | 3.3 |
| Elongation at break % | 590 | 650 | 560 | 670 |
| Tear propagation value N/mm | 45.1 | 48.6 | 37.2 | 44.3 |
| Rebound % | 40 | 38 | 36 | 33 |
| Compression set % | 33/ 32 | 28/ 28 | 38/ 38 | 27/ 30 |
| Mooney viscosity | 63/57 | | 67/61 | |

A comparison of the results of Example 16 and of Comparison Experiment 2 shows that the vulcanisate according to Example 16 has a higher Shore hardness, i.e. a higher crosslinking density, higher values for the modulus 100% and modulus 300%, i.e. a higher crosslinking density and a high elasticity, a better tear propagation resistance, a higher rebound and therefore a better elasticity, a lower compression set when peroxide 1 is used and a lower Mooney viscosity than the vulcanisate according to Comparison Experiment 2.

We claim:

1. In a composition containing fillers which is crosslinkable by means of free radical formation to give elastomers said composition comprising an organopolysiloxane admixture, the improvement comprising selecting as said organopolysiloxane admixture an organopolysiloxane admixture consisting of:

(1) high-viscosity diorganopolysiloxanes having a value of at least 3000 Nm determined in a Brabender Plastograph at 23° C. and 60 revolutions per minute; and (2) low-viscosity vinyl-containing organpolysiloxanes having an average viscosity of 20 to $1\times10^6$ mPa·s at 25° C., consisting of (a) siloxane units selected from the group consisting of the formulae $R^1R_2SiO_{1/2}$, $R_3SiO_{1/2}$, and mixtures thereof; (b) siloxane units selected from the group consisting of the formulae $R^1RSiO$, $R_2SiO$, and mixtures thereof; and (c) siloxane units selected from the group consisting of the formulae $RSiO_{3/2}$, $R^1SiO_{3/2}$, $SiO_2$, and mixtures thereof;

in which

R is a monovalent, unsubstituted or halogen- or cyano-substituted hydrocarbon radical having 1 to 18 carbon atoms per radical and $R^1$ is a vinyl radical, with the proviso that the organopolysiloxanes contain at least 1.0% by weight of Si-bonded vinyl groups.

2. A composition as claimed in claim 1, wherein the low-viscosity, vinyl-containing organopolysiloxanes are those of $R^1R_2SiO_{1/2}$—, $R_2SiO$—, $R^1RSiO$— and $RSiO_{3/2}$ units or $R^1R_2SiO_{1/2}$—, $R_2SiO$—, $R^1RSiO$— and $SiO_2$ units, in which R is a monovalent, unsubstituted or halogen- or cyano-substituted hydrocarbon radical having 1 to 18 carbon atoms per radical and $R^1$ is a vinyl radical.

3. A composition as claimed in claim 1, further comprising as an agent which forms free radicals, (4) an organic peroxide.

4. A composition as claimed in claim 1, wherein low-viscosity vinyl-containing organopolysiloxanes (2) are present in amounts of 0.3% to 12% by weight, based on the total weight of the high-viscosity diorganopolysiloxanes (1).

5. A process for the preparation of a composition as claimed in claim 1, which comprises mixing:

(1) high-viscosity diorganopolysiloxanes having a value of at least 3000 Nm determined in a Brabender Plastograph at 23° C. and 60 revolutions per minute;

(2) low-viscosity vinyl-containing organopolysiloxanes having an average viscosity of 20 to $1\times10^6$ mPa·s at 25° C., consisting of (a) siloxane units of the group consisting of the formulae $R^1R_2SiO_{1/2}$, $R_3SiO_{1/2}$, and mixtures thereof; (b) siloxane units of the group consisting of the formulae $R^1RSiO$, $R_2SiO$, and mixtures thereof; and (c) siloxane units of the group consisting of the formulae $RSiO_{3/2}$, $R^1SiO_{3/2}$, $SiO_2$, and mixtures thereof;

in which

R is a monovalent, unsubstituted or halogen- or cyano-substituted hydrocarbon radical having 1 to 18 carbon atoms per radical, and $R^1$ is a vinyl radical, with the proviso that the organopolysiloxanes contain at least 1.0% by weight of Si-bonded vinyl groups; and (3) fillers.

6. The composition of claim 1 wherein said low viscosity vinyl-containing organopolysiloxane comprises siloxane units (a), siloxane units (b), and T siloxane units selected from the group consisting of $RSiO_{3/2}$, $R^1SiO_{3/2}$, and mixtures thereof, wherein the mol ratio of said T siloxane units to said siloxane units (a) is from about 1:6 to about 1:24; and the mol ratio of said T siloxane units to said siloxane units (b) is from about 1:200 to about 1:250.

7. The composition of claim 1 wherein siloxane units (b) consist of a mixture containing $R_2SiO$ and $R^1RSiO$ in a mol ratio of about 1:0.025 to about 1:0.1.

8. An organopolysiloxane composition which is crosslinkable by means of free radical formation to give elastomers, comprising:

(1) high-viscosity diorganopolysiloxanes having a value of at least 3000 Nm determined in a Brabender Plastograph at 23° C. and 60 revolutions per minute;

(2) low-viscosity vinyl-containing organopolysiloxanes having an average viscosity of 20 to $1\times10^6$ mPa·s at 25° C., consisting of (a) siloxane units selected from the formulae $R^1R_2SiO_{1/2}$, $R_3SiO_{1/2}$, and mixtures thereof; (b) siloxane units selected from the formulae $R^1RSiO$, $R_2SiO$, and mixtures thereof; and (c) siloxane units selected from the formulae $RSiO_{3/2}$, $R^1SiO_{3/2}$, $SiO_2$, and mixtures thereof;

in which

R is a monovalent, unsubstituted or substituted hydrocarbon radical having 1 to 18 carbon atoms per radical and $R^1$ is a vinyl radical, with the proviso that the organopolysiloxanes contain at least 1.0% by weight of Si-bonded vinyl groups, and (3) fillers, wherein said low viscosity vinyl-containing organopolysiloxane comprises siloxane units (a), siloxane units (b), and T siloxane units selected from the group consisting of $RSiO_{3/2}$, $R^1SiO_{3/2}$, and mixtures thereof, wherein the mol ratio of said T siloxane units to said siloxane units (a) is from about 1:5 to about 1:100; and the mol ratio of said T siloxane units to said siloxane units (b) is from about 1:100 to about 1:300.

9. The composition of claim 8 wherein siloxane units (b) consist of a mixture containing $R_2SiO$ and $R^1RSiO$ in a mol ratio of about 1:0.025 to about 1:0.1.

10. An organopolysiloxane composition which is crosslinkable by means of free radical formation to give elastomers, comprising:

(1) high-viscosity diorganopolysiloxanes having a value of at least 3000 Nm determined in a Brabender Plastograph at 23° C. and 60 revolutions per minute;

(2) low-viscosity vinyl-containing organopolysiloxanes having an average viscosity of 20 to $1\times10^6$ mPa·s at 25° C., consisting of (a) siloxane units selected from the group consisting of the formulae $R^1R_2SiO_{1/2}$, $R_3SiO_{1/2}$, and mixtures thereof; (b) siloxane units selected from the group consisting of the formulae $R^1RSiO$, $R_2SiO$, and mixtures thereof, optionally further containing HRSiO units; and (c) siloxane units selected from the group consisting of the formulae $RSiO_{3/2}$, $R^1SiO_{3/2}$, $SiO_2$, and mixtures thereof;

in which

R is a monovalent, unsubstituted or halogen- or cyano-substituted hydrocarbon radical having 1 to 18 carbon atoms per radical and $R^1$ is a vinyl radical, with the proviso that the organopolysiloxanes contain at least 1.0% by weight of Si-bonded vinyl groups, and (3) fillers wherein said low viscosity vinyl-containing organopolysiloxane comprises siloxane units (a), siloxane units (b), and T siloxane units selected from the group consisting of $RSiO_{3/2}$, $R^1SiO_{3/2}$, and mixtures thereof, wherein the mol ratio of said T siloxane units to said siloxane units (a) is from about 1:5 to about 1:100; and the mol ratio of said T siloxane units to said siloxane units (b) is from about 1:100 to about 1:300.

11. The composition of claim 10 wherein said low viscosity vinyl-containing organopolysiloxane comprises siloxane units (a), siloxane units (b), and T siloxane units selected from the group consisting of $RSiO_{3/2}$, $R^1SiO_{3/2}$, and mixtures thereof, wherein the mol ratio of said T siloxane units to said siloxane units (a) is from about 1:6 to about 1:24; and the mol ratio of said T siloxane units to said siloxane units (b) is from about 1:200 to about 1:250.

12. The composition of claim 10 wherein siloxane units (b) consist of a mixture containing $R_2SiO$ and $R^1RSiO$ in a mol ratio of about 1:0.025 to about 1:0.1.

13. The composition of claim 11 wherein siloxane units (b) consist of a mixture containing $R_2SiO$ and $R^1RSiO$ in a mol ratio of about 1:0.025 to about 1:0.1.

14. An organopolysiloxane composition which is crosslinkable by means of free radical formation to give elastomers, comprising:

(1) high-viscosity diorganopolysiloxanes having s value of at least 3000 Nm determined in a Brabender Plastograph at 23° C. and 60 revolutions per minute;

(2) low-viscosity vinyl-containing organopolysiloxanes having an average viscosity of 20 to $1\times10^6$ mPa·s at 25° C., consisting of (a) siloxane units selected from the formulae $R^1R_2SiO_{1/2}$, $R_3SiO_{1/2}$, and mixtures thereof; (b) siloxane units selected from the formulae $R^1RSiO$, $R_2SiO$, and mixtures thereof; and (c) siloxane units selected from the formulae $RSiO_{3/2}$, $R^1SiO_{3/2}$, $SiO_2$, and mixtures thereof;

in which

R is a monovalent, unsubstituted or substituted hydrocarbon radical having 1 to 18 carbon atoms per radical and $R^1$ is a vinyl radical, with the proviso that the organopolysiloxanes contain at least 1.0% by weight of Si-bonded vinyl groups, and (3) fillers, wherein said low viscosity vinyl-containing organopolysiloxane comprises siloxane units (a), siloxane units (b), and Q siloxane units of the formula $SiO_2$, wherein the mol ratio of Q siloxane units to siloxane units (a) is from about 1:5 to about 1:100; and the mol ratio of Q siloxane units to siloxane units (b) is from about 1:100 to about 1:300.

15. The composition of claim 14 wherein said low viscosity vinyl-containing organopolysiloxane comprises siloxane units (a), siloxane units (b), and Q siloxane units of the formula $SiO_2$, wherein the mol ratio of Q siloxane units to siloxane units (a) is from about 1:6 to about 1:24; and the mol ratio of Q siloxane units to siloxane units (b) is from about 1:200 to about 1:250.

16. The composition of claim 14 wherein siloxane units (b) consist of a mixture containing $R_2SiO$ and $R^1RSiO$ in a mol ratio of about 1:0.025 to about 1:0.1.

17. The composition of claim 15 wherein siloxane units (b) consist of a mixture containing $R_2SiO$ and $R^1RSiO$ in a mol ratio of about 1:0.025 to about 1:0.1.

18. An organopolysiloxane composition which is crosslinkable by means of free radical formation to give elastomers, comprising:

(1) high-viscosity diorganopolysiloxanes having a value of at least 3000 Nm determined in a Brabender Plastograph at 23° C. and 60 revolutions per minute wherein said diorganopolysiloxanes are free of vinyl groups;

(2) low-viscosity vinyl-containing organopolysiloxanes having an average viscosity of 20 to $1\times10^6$ mPa·s at 25° C., consisting of (a) siloxane units selected from the group consisting of the formulae $R^1R_2SiO_{1/2}$, $R_3SiO_{1/2}$, and mixtures thereof; (b) siloxane units selected from the group consisting of the formulae $R^1RSiO$, $R_2SiO$, and mixtures thereof, optionally further containing HRSiO units; and (c) siloxane units selected from the group consisting of the formulae $RSiO_{3/2}$, $R^1SiO_{3/2}$, $SiO_2$, and mixtures thereof;

in which

R is a monovalent, unsubstituted or halogen- or cyano-substituted hydrocarbon radical having 1 to 18 carbon atoms per radical and $R^1$ is a vinyl radical, with the proviso that the organopolysiloxanes contain at least 1.0% by weight of Si-bonded vinyl groups, and (3) fillers.

* * * * *